(12) United States Patent
Symes et al.

(10) Patent No.: US 8,700,688 B2
(45) Date of Patent: Apr. 15, 2014

(54) POLYNOMIAL DATA PROCESSING OPERATION

(75) Inventors: Dominic H Symes, Cambridge (GB);
Daniel Kershaw, Cambridge (GB);
Martinus C Wezelenburg,
Leuven-Heverlee (BE)

(73) Assignee: U-Blox AG, Thalwil (CH)

( * ) Notice: Subject to any disclaimer, the term of this patent is extended or adjusted under 35 U.S.C. 154(b) by 1121 days.

(21) Appl. No.: 12/379,447

(22) Filed: Feb. 23, 2009

(65) Prior Publication Data

US 2009/0248780 A1 Oct. 1, 2009

(30) Foreign Application Priority Data

Mar. 26, 2008 (GB) .................................. 0805491.8

(51) Int. Cl.
*G06F 15/00* (2006.01)
*G06F 7/44* (2006.01)
*G06F 7/38* (2006.01)
*G06F 7/32* (2006.01)
*H03M 13/00* (2006.01)

(52) U.S. Cl.
USPC ........... 708/650; 708/492; 708/504; 708/518; 708/520; 714/781; 714/782; 712/221

(58) Field of Classification Search
USPC ..................... 714/782; 716/109; 708/65, 492; 712/221
See application file for complete search history.

(56) References Cited

U.S. PATENT DOCUMENTS 4,852,098 A * 7/1989 Brechard et al. ............. 714/782
5,459,681 A * 10/1995 Harrison et al. ............. 708/520
5,602,767 A * 2/1997 Fettweis et al. ............... 708/492
6,009,450 A 12/1999 Dworkin et al.
6,523,054 B1 2/2003 Kamijo
6,662,346 B1 * 12/2003 Yu et al. ......................... 716/109
6,721,771 B1 * 4/2004 Chang ............................ 708/492
7,403,964 B2 * 7/2008 Porten et al. ................... 708/492
7,464,128 B1 * 12/2008 Pitsianis et al. ............... 708/492
7,930,335 B2 * 4/2011 Gura et al. ..................... 708/492

(Continued)

FOREIGN PATENT DOCUMENTS

GB        2 389 678         12/2003
GB        2389678 A   *    12/2003

(Continued)

OTHER PUBLICATIONS

Search Report for UK 0805491.8 dated Jul. 4, 2008.

(Continued)

*Primary Examiner* — Farley Abad
*Assistant Examiner* — Henry Yu
(74) *Attorney, Agent, or Firm* — Nixon & Vanderhye P.C.

(57) ABSTRACT

A data processing system 2 includes an instruction decoder 22 responsive to polynomial divide instructions $DIVL.P_N$ to generate control signals that control processing circuitry 26 to perform a polynomial division operation. The denominator polynomial is represented by a denominator value stored within a register with an assumption that the highest degree term of the polynomial always has a coefficient of "1" such that this coefficient need not be stored within the register storing the denominator value and accordingly the denominator polynomial may have a degree one higher than would be possible with the bit space within the register storing the denominator value alone. The polynomial divide instruction returns a quotient value and a remainder value respectively representing the quotient polynomial and the remainder polynomial.

29 Claims, 4 Drawing Sheets

(56) References Cited

U.S. PATENT DOCUMENTS

| | | | |
|---|---|---|---|
| 7,958,436 B2 * | 6/2011 | King et al. | 714/781 |
| 2003/0208518 A1 * | 11/2003 | Gura et al. | 708/492 |
| 2004/0078411 A1 * | 4/2004 | Porten et al. | 708/492 |
| 2004/0117601 A1 * | 6/2004 | Spracklen et al. | 712/221 |
| 2004/0267681 A1 | 12/2004 | Savage | |

FOREIGN PATENT DOCUMENTS

| | | | |
|---|---|---|---|
| GB | 2458665 A | * | 9/2009 |
| JP | 2000-172520 | | 6/2000 |
| WO | WO 00/41068 | | 7/2000 |

OTHER PUBLICATIONS

Mamidi et al., Instruction Set Extensions for Reed-Solomon Encoding and Decoding, University of Wisconsin-Madison, (No date), (6 pages).

DSP Control Register File Extensions, (6 pages).

PCT International Search Report dated Apr. 22, 2008 for GB 0801590.1.

English translation of Japanese Office Action mailed Oct. 23, 2012 in JP 2011-501283.

Chinese First Office Action dated Jan. 16, 2013 in CN 200980110591.5.

* cited by examiner

DIVL.P$_N$ $\overbrace{r0, r1,}^{\text{(numerator)}}$ $\overbrace{r2}^{\text{(denominator-2}^N\text{)}}$ quotient = (r0+x$^N$∗r1) div (x$^N$+r2)
(r3)

remainder = (r0+x$^N$∗r1) mod (x$^N$+r2)
(r4)

Vector Polynomial Divide
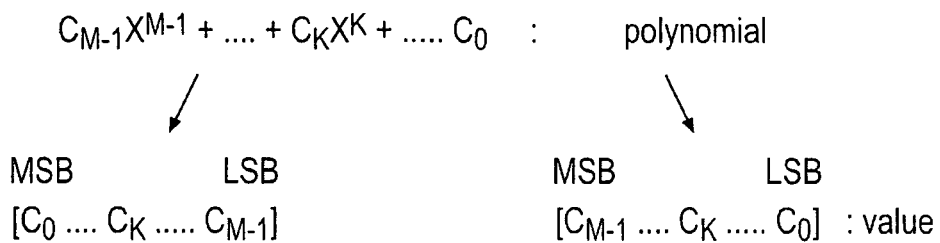
FIG. 5
$$C_{M-1}X^{M-1} + \ldots + C_K X^K + \ldots C_0 \quad : \quad \text{polynomial}$$
MSB  LSB                MSB  LSB
$[C_0 \ldots C_K \ldots C_{M-1}]$        $[C_{M-1} \ldots C_K \ldots C_0]$ : value
FIG. 6
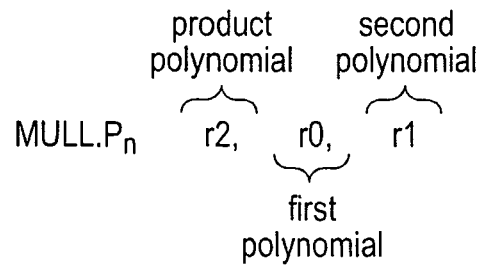
product = (r0) mul (r1)
         (r2)
FIG. 7

POLYNOMIAL DATA PROCESSING OPERATION

BACKGROUND OF THE INVENTION

1. Field of the Invention

This invention relates to the field of data processing systems. More particularly, this invention relates to data processing systems providing support for polynomial data processing operations.

2. Description of the Prior Art

It is known within data processing systems to provide some support for polynomial arithmetic. For example, it is known to provide support for polynomial arithmetic associated with Reed Solomon coding or Elliptic Curve Cryptography. One known data processing system providing such support is the digital signal processor produced by Texas Instruments as TMS320C64x. These digital signal processors provide an instruction to perform the operation:

$a = b*c \bmod p$ (where $b$ is 32-bits and $c$ is 9-bits), and where p is held in a special 32-bit register (GPLYA or GPLYB)

This known form of polynomial instruction yields the remainder portion of a polynomial multiplication providing a good support for Reed Solomon coding. It is not suited to other forms of polynomial data processing, such as that associated with signal scrambling or the calculation of transmission codes.

It is also known to provide special purpose hardware for the purpose of signal scrambling or generating transmission codes. Such special purpose hardware can be provided in a form capable of performing the necessary calculations at high speed, but has the disadvantage of consuming significant circuit resource for this dedicated function as well as being relatively inflexible and illsuited to reuse and/or modification.

SUMMARY OF THE INVENTION

Viewed from one aspect the present invention provides apparatus for processing data comprising:

an instruction decoder responsive to a program instruction to generate one or more control signals;

a register bank having a plurality of registers; and processing circuitry coupled to said instruction decoder and said register bank and responsive to said one or more control signals to perform a data processing operation corresponding to said program instruction upon one or more data values stored within said register bank; wherein said instruction decoder is responsive to a polynomial divide instruction to generate one or more control signals that control said processing circuitry to generate at least a quotient value representing a quotient polynomial for a polynomial division over a field of two elements of a numerator polynomial by a denominator polynomial, said denominator polynomial being an N degree polynomial given by the sum of $c_i x^i$ for $N \geq i \geq 0$ where $c_{(N-1)}$ to $c_0$ are respective bits stored in a register of said register bank and $c_N = 1$ and is not stored within said register.

The present technique provides a programmable data processing apparatus having general purpose elements such as an instruction decoder, a register bank and processing circuitry with the capability of additionally providing a polynomial divide instruction which at least generates a quotient value representing a quotient polynomial resulting from a polynomial division. Furthermore, the denominator polynomial is stored within a register of the register bank in a form in which the coefficient of the highest degree term of the polynomial is fixed at "1" and is assumed rather than requiring to be stored within a register. This permits the denominator polynomial to have a degree one higher than the bit-width being used to store the denominator value thereby permitting more effective use of the bit space within the registers of the register bank to represent the results of the polynomial divide so as to more readily match the maximum bit-width of possible results.

The register storing the coefficients of the denominator polynomial can be an N-bit register.

Whilst the polynomials being manipulated can be represented by values stored within the registers in a variety of different ways, it is convenient to represent them by storing the coefficients for the different terms at respective bit positions of values stored within a register.

The coefficients can be stored in different orders within the values held within the register, such as with the lowest degree term having its coefficient stored at the most significant bit position progressing to the highest degree term with its coefficient stored at the least significant bit position, or the opposite way around (e.g. similar to little endian or big endian storage).

The numerator polynomial will often be of a higher degree that the denominator polynomial and accordingly convenient embodiments represent the numerator polynomial by a 2N-bit numerator value stored within either two N-bit registers or within a 2N-bit register within the register bank when such wider registers (e.g. accumulator registers) are provided within the register bank.

The polynomial division instruction may also generate a remainder value representing a remainder polynomial resulting from the polynomial division as well as the quotient value representing the quotient polynomial. While the quotient polynomial is useful in generating scrambled signals, transmission codes and the like, the remainder polynomial is also useful in other circumstances and accordingly it is convenient if both are generated from the polynomial division instruction.

The remainder value and the quotient value may be conveniently stored within respective N-bit registers of the register bank.

The efficiency of the implementation of this technique is improved when the register bank used comprises a plurality of general purpose scalar registers used by program instructions other than the polynomial divide instruction.

The general applicability of the data processing system incorporating the polynomial divide instruction and the ability to reuse this system for a variety of functions is enhanced when it additionally provides a polynomial multiply instruction in combination with the above described polynomial divide instruction.

Whilst the polynomial divide instruction may often be required in a scalar form, it is also possible that in some embodiments it is desirable to provide the polynomial divide instruction as a vector instruction with the denominator value being a scalar value as the denominator value will typically change infrequently and need to be applied to long vector sequences of numerator values to generate vector sequences of quotient values.

Viewed from another aspect the present invention provides a method of processing data comprising the steps of:

decoding a program instruction to generate one or more control signals;

in response to said one or more control signals, performing a data processing operation corresponding to said program instruction upon one or more data values stored within a register bank having a plurality of registers; wherein said decoding is responsive to a polynomial divide instruction to generate one or more control signals that control generation of at least a quotient value representing a quotient polynomial for a polynomial division over a field of two elements of a numerator polynomial by a denominator polynomial, said denominator polynomial being an N degree polynomial given by the sum of $c_i x^i$ for $N \geq i \geq 0$, where $c_{(N-1)}$ to $c_0$ are respective bits stored in a register of said register bank and $c_N=1$ and is not stored within said register.

It will be appreciated that a further aspect of the invention is the provision of computer programs which incorporate the polynomial divide instruction discussed above for controlling hardware in accordance with the present technique.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 illustrates an example syntax for a vector polynomial divide instruction;

FIG. 6 illustrates two alternative ways in which a polynomial may be represented by a value stored within a register; and FIG. 7 schematically illustrates the syntax of a polynomial multiply instruction.

DESCRIPTION OF THE PREFERRED EMBODIMENTS

Figures 1, 2:
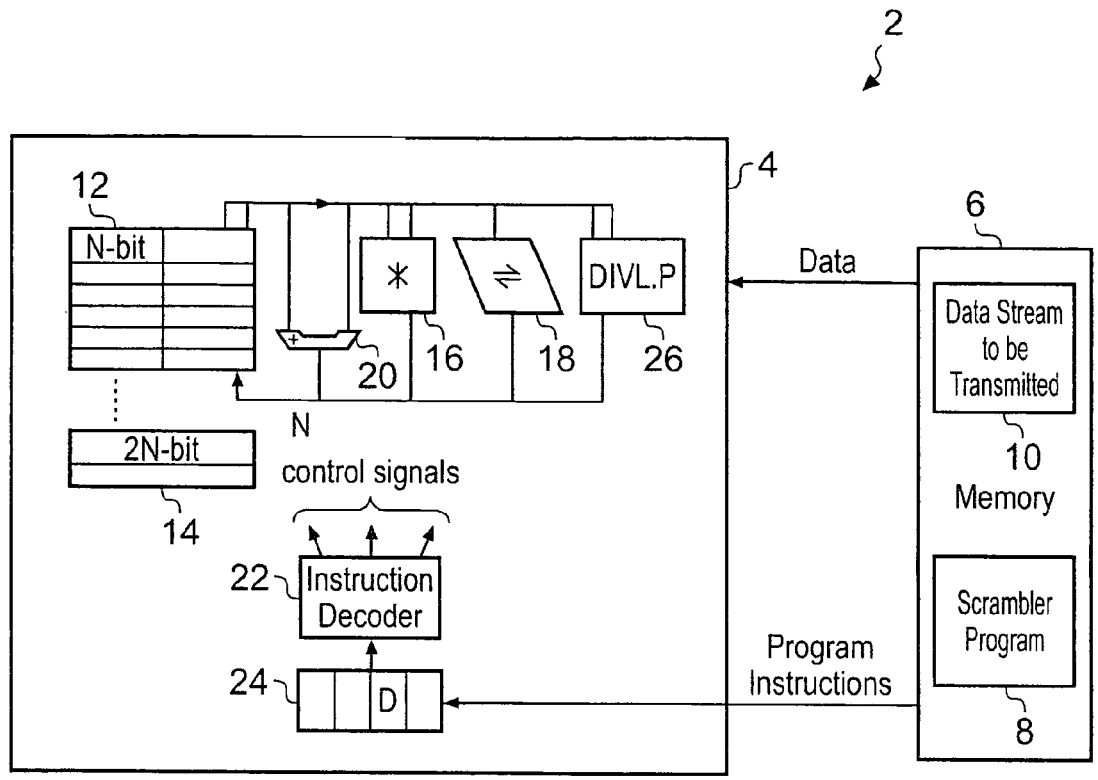
FIG. 1 schematically illustrates a data processing apparatus including support for a polynomial division instruction.
FIG. 2 schematically illustrates the syntax of a polynomial divide instruction.

FIG. 1 illustrates a data processing apparatus 2 in the form of a processor 4 coupled to a memory 6. The memory 6 stores program instructions 8, such as program instructions for performing signal scrambling, as well as data values to be subject to processing operations, such as data values 10 forming a stream to be scrambled and transmitted.

The processor 4 includes a register bank 12 formed of N-bit registers (e.g. 32-bit registers) as well as (optionally) some 2N-bit registers 14 which are provided for use as accumulator registers in association with multiply accumulate instructions. Processing elements including a multiplier 16, a shifter 18 and an adder 20 perform processing operations under control of control signals generated by an instruction decoder 22 in response to program instructions progressing along an instruction pipeline 24 when fetched from the memory 6. The processor 4 is a general purpose processor with a scalar register bank 12, 14 for performing general purpose data processing operations, such as normal logic and arithmetic operations, in response to program instructions fetched from the memory 6. The control signals generated by the instruction decoder 22 configure the data processing elements 16, 18, 20 to perform the desired data processing operations.

Additionally provided within the processor 4 is polynomial division circuitry 26 which is responsive to control signals generated by the instruction decoder 22 to perform polynomial division operations upon data values retrieved from the memory 6 (via the registers 12, 14). These polynomial division operations and the polynomial divide instruction will be described further below.

FIG. 2 schematically illustrates the syntax of a polynomial divide instruction DIVL.Pn. In the syntax DIVL.Pn (and divl_pn in the code discussed later) "n" is the width of the operation (e.g. 8, 16 or 32) and may be less than the width of the register "N". In the following examples it is assumed that N=n, but it will be appreciated that the present technique is also applicable when N≠n (e.g. N=32 and n=8, 16 or 32). The polynomial divide instruction uses three registers to hold its input operands. These registers are N-bit registers within the register bank 12 in this example. The numerator value, which represents a numerator polynomial, is stored within registers r0 and r1. The numerator value is accordingly a 2N-bit value. Denominator value, which represents the denominator polynomial, is stored within register r2. The dominator value represents the denominator polynomial with the assumption that the denominator polynomial starts with its highest degree term having a coefficient of "1" and accordingly the dominator value need only represent the coefficients of the terms following this highest degree term. This permits the denominator polynomial to include a maximum number of terms one greater than the width of the register r2. This is an advantage since the resulting remainder value from such a polynomial divide will have a bit length one less than the denominator value and accordingly will naturally fit the register size without wasted register bit space when the register r2 and the register in which the remainder value is stored (r4) have the same width. Thus, in the case of 32-bit register the denominator quotient can have 33 terms and the remainder quotient can have 32 terms.

As will be seen in FIG. 2, the polynomial divide instruction DIVL.Pn returns a quotient value representing the quotient polynomial into register r3 and a remainder value representing a remainder polynomial into register r4. In the syntax illustrated it will be seen that the denominator quotient is extended with a highest degree term $x^N$ in addition to the terms with coefficients specified by the bits of the denominator value stored within register r2. The numerator polynomial takes as its high degree portion terms specified by the coefficients stored within register r1 (indicated as being boosted to the high degree portion by multiplication by $x^N$) with the low degree portion of the numerator polynomial being formed with the terms having coefficients taken from the register r0.

It will be seen that the degree of the polynomials being manipulated is represented in this general syntax by the variable N. It will be appreciated that this can take a variety of different values and the polynomials being manipulated can be, for example, degree 8, 16 or 32 depending upon the data processing requirements. Other values for N are also possible.

One way of viewing the polynomial divide instruction in the case of N=32 is that it gives a result equivalent to the following C program code:

```
poly32_t q=x0, r=x1, p=x2;
int C,i;
for (i=0; i<32; i++)
{
    C = r>>31;
    r = r<<1;
    if (C)
    {
        r = r ^ p;
    }
    if (q>>31)
```

-continued

```
        {
                r = r ^ 1;
        }
        q = (q<<1) | C;
}
*x3 = q;        /*      ((x1<<32) +x0) div ((1<<32)+x2)    */
return r;       /*      ((x1<<32) +x0) mod ((1<<32)+x2)    */
```

Figure 3:
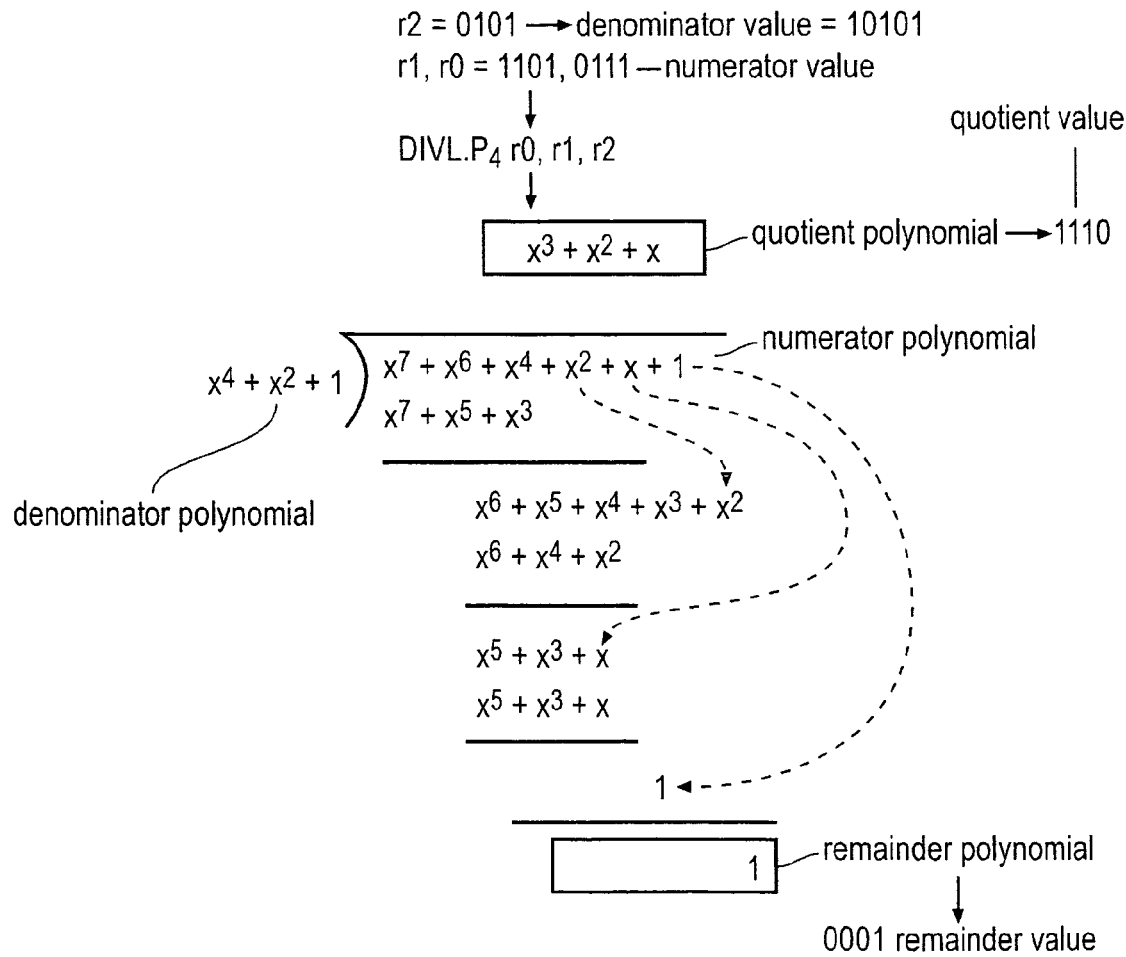
FIG. 3 schematically illustrates an example polynomial division operation.

FIG. 3 schematically illustrates an example polynomial division operation. In this case N=4 resulting in a denominator polynomial with up to five terms and a numerator polynomial with up to eight terms. In the example illustrated the coefficients for the denominator polynomial terms $x^3$ and $x$ are both zero. Accordingly, the denominator polynomial is $x^4+x^2+1$. The denominator value stored within register r2 is "0101" and this is extended at its most significant end by a value of "1" to give the coefficients for the denominator polynomial as it is assumed that the highest degree term within the denominator polynomial always has a coefficient of "1". It will be appreciated by those in this technical field that this assumption may require alignment of the denominator polynomial with an associated alignment in any numerator polynomial in order that the assumption is correct. However, denominator polynomials are often quasi-fixed values and accordingly such an alignment of the denominator polynomial will normally not be required for every calculation. Furthermore, the numerator polynomial is often a data stream and accordingly alignment within such data stream is normally achieved by picking an appropriate starting point.

The action of the polynomial divide instruction is similar to a long division instruction. In polynomial arithmetic over a field of two elements (i.e. the coefficient of the terms can be either "0" or "1") addition and subtraction are equivalent to an exclusive-OR function. Multiplication is equivalent to an AND operation. These operations are performed in respect of the terms of the same degree. In the example illustrated the quotient polynomial resulting from the polynomial divide instruction is "$x^3+x^2+x$" and this is represented by a quotient value of "1110". The remainder polynomial is "1" and this is represented by a remainder value of "0001".

Figure 4:
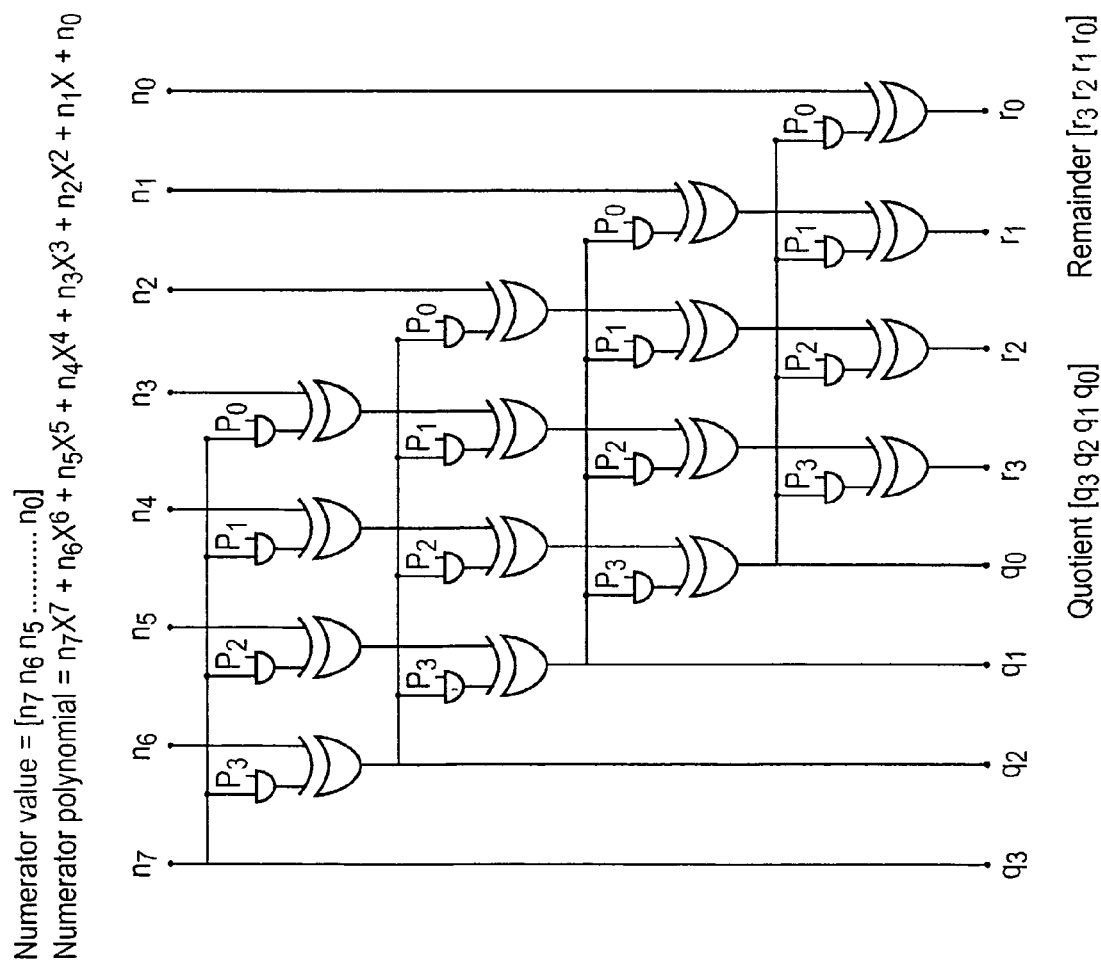
FIG. 4 schematically illustrates a circuit for performing a polynomial division operation in response to a polynomial division instruction.

FIG. 4 schematically illustrates circuitry for implementing a polynomial divide instruction of degree 4, such as may be provided by the polynomial division circuitry 26 of FIG. 1. As will be seen, the circuitry for performing the polynomial divide operation in response to the polynomial divide instruction comprises an arrangement of AND gates and XOR gates. The inputs to these gates are the numerator value $[n_7:n_0]$ and the denominator value $[1:p_0]$.

The circuitry in FIG. 4 is controlled by control signals generated by the instruction decoder 22 in response to a polynomial divide instruction in that the circuitry is activated for use and the numerator value and denominator value are read out from the register bank 12 and supplied to the inputs in the circuitry of FIG. 4. Furthermore, the quotient value $[q_3:q_0]$ and the remainder value $[r_3:r_0]$ are similarly read from the outputs of the circuitry of FIG. 4 and stored back into registers within the register bank 12. In this example, two write ports are provided to the register bank 12 in order to allow both the quotient value the remainder value to be written therein.

It will be appreciated that the circuit of FIG. 4 is for calculating polynomial divides with a degree of four. However, regular extension of this circuitry provides polynomial divide instruction operation for polynomial divides of a higher degree and in practice the same circuitry can be reused for these divides of differing degree with appropriate multiplexing of signal values, as will be familiar to those in this technical field.

Given below is an example of register transfer language (RTL) defining circuitry for performing a polynomial divide of either 32, 16 or 8 degree.

```
> // Polynomial divider
>
//------------------------------------------------------------------
-------
>
>   //--------------------------------------------------------
>   // Divider Ex stage
>   //--------------------------------------------------------
>   always @ (posedge clk)
>     if (cmd_div_en) begin
>         d_din_h_ex <= din_a_sz;
>         d_poly_ex <= din_b_sh;
>     end
> // Common terms
> assign d_i = d_din_h_ex;
> assign d_p = d_poly_ex;
> assign d_p_29 = d_p[30] ^ d_p[31];
> assign d_p_28 = d_p[29] ^ d_p[31];
> assign d_p_27 = d_p[28] ^ (d_p[30] | d_p[31]);
> assign d_p_26 = d_p[27] ^ (d_p[31] & ~(d_p[29] ^ d_p[30]));
> assign d_p_25 = d_p[26] ^ d_p[29] ^ (d_p[31] & d_p[28]) ^ (d_p[31]
> | d_p[30]);
>
> // Divider - 1st 8-bits
> assign d_o[31] = d_i[31];
> assign d_o[30] = d_i[30] ^
>                  (d_i[31] & d_p[31]);
> assign d_o[29] = d_i[29] ^
>                  (d_i[30] & d_p[31]) ^
>                  (d_i[31] & d_p_29);
> assign d_o[28] = d_i[28] ^
>                  (d_i[31] & d_p_28) ^
>                  (d_i[30] & d_p_29) ^
>                  (d_i[29] & d_p[31]);
```

```
>       assign d_o[27] = d_i[27] ^
>                       (d_i[28] & d_p[31]) ^
>                       (d_i[29] & d_p_29) ^
>                       (d_i[30] & d_p_28) ^
>                       (d_i[31] & d_p_27);
>       assign d_o[26] = d_i[26] ^
>                       (d_i[27] & d_p[31]) ^
>                       (d_i[28] & d_p_29) ^
>                       (d_i[29] & d_p_28) ^
>                       (d_i[30] & d_p_27) ^
>                       (d_i[31] & d_p_26);
>       assign d_o[25] = d_i[25] ^
>                       (d_i[26] & d_p[31]) ^
>                       (d_i[27] & d_p_29) ^
>                       (d_i[28] & d_p_28) ^
>                       (d_i[29] & d_p_27) ^
>                       (d_i[30] & d_p_26) ^
>                       (d_i[31] & (d_p[26] ^ d_p_29 ^ (d_p[31] &
> d_p[28]) ^ (d_p[31] | d_p[30]))); assign d_o[24] = d_i[24] ^
>                       (d_i[25] & d_p[31]) ^
>                       (d_i[26] & d_p_29) ^
>                       (d_i[27] & d_p_28) ^
>                       (d_i[28] & d_p_27) ^
>                       (d_i[29] & d_p_26) ^
>                       (d_i[30] & (d_p[26] ^ d_p_29 ^ (d_p[31] &
>       d_p[28]) ^ (d_p[31] | d_p[30]))) ^ (d_i[31] &
>       d_p[25]) ^ (d_i[31] & d_p[31] & d_p[27]) ^
>                       (d_i[31] & d_p[30] & d_p[29]) ^
>                       (d_i[31] & d_p[31]);
>       assign dpp_31 = { { 1{1'b0}}, (('AR1DPU_INT_WIDTH{d_o[31]}} &
>       d_poly_ex), {31{1'b0}} }; assign dpp_30 = { { 2{1'b0}},
>       (('AR1DPU_INT_WIDTH{d_o[30]}} & d_poly_ex), {30{1'b0}} }; assign
>       dpp_29 = { { 3{1'b0}}, (('AR1DPU_INT_WIDTH{d_o[29]}} & d_poly_ex),
>       {29{1'b0}} }; assign dpp_28 = { { 4{1'b0}},
>       (('AR1DPU_INT_WIDTH{d_o[28]}} & d_poly_ex), {28{1'b0}} }; assign
>       dpp_27 = { { 5{1'b0}}, (('AR1DPU_INT_WIDTH{d_o[27]}} & d_poly_ex),
>       {27{1'b0}} }; assign dpp_26 = { { 6{1'b0}},
>       (('AR1DPU_INT_WIDTH{d_o[26]}} & d_poly_ex), {26{1'b0}} }; assign
>               dpp_25 = { { 7{1'b0}},
>                       (('AR1DPU_INT_WIDTH{d_o[25]}} & d_poly_ex),
> {25{1'b0}} }; assign dpp_24 = { { 8{1'b0}},
> (('AR1DPU_INT_WIDTH{d_o[24]}} & d_poly_ex), {24{1'b0}} }; assign
> dp_24 = (({d_i, {32{1'b0}}} ^ dpp_31 ^ dpp_28) ^ ((dpp_30 ^ dpp_29)
> ^ dpp_27) ^ (dpp_26 ^ dpp_25) ^ dpp_24;
>
>       // Divider - 2nd 8-bits
>       assign d_o[23] = dp_24[23+32];
>       assign d_o[22] = dp_24[22+32] ^
>                       (dp_24[23+32] & d_p[31]);
>       assign d_o[21] = dp_24[21+32] ^
>                       (dp_24[22+32] & d_p[31]) ^
>                       (dp_24[23+32] & d_p_29);
>       assign d_o[20] = dp_24[20+32] ^
>                       (dp_24[23+32] & d_p_28) ^
>                       (dp_24[22+32] & d_p_29) ^
>                       (dp_24[21+32] & d_p[31]);
>       assign d_o[19] = dp_24[19+32] ^
>                       (dp_24[20+32] & d_p[31]) ^
>                       (dp_24[21+32] & d_p_29) ^
>                       (dp_24[22+32] & d_p_28) ^
>                       (dp_24[23+32] & d_p_27);
>       assign d_o[18] = dp_24[18+32] ^
>                       (dp_24[19+32] & d_p[31]) ^
>                       (dp_24[20+32] & d_p_29) ^
>                       (dp_24[21+32] & d_p_28) ^
>                       (dp_24[22+32] & d_p_27) ^
>                       (dp_24[23+32] & d_p_26);
>       assign d_o[17] = dp_24[17+32] ^
>                       (dp_24[18+32] & d_p[31]) ^
>                       (dp_24[19+32] & d_p_29) ^
>                       (dp_24[20+32] & d_p_28) ^
>                       (dp_24[21+32] & d_p_27) ^
>                       (dp_24[22+32] & d_p_26) ^
>                       (dp_24[23+32] & (d_p[26] ^ d_p_29 ^ (d_p[31] &
> d_p[28]) ^ (d_p[31] | d_p[30]))); assign d_o[16] = dp_24[16+32] ^
>                       (dp_24[17+32] & d_p[31]) ^
>                       (dp_24[18+32] & d_p_29) ^
>                       (dp_24[19+32] & d_p_28) ^
>                       (dp_24[20+32] & d_p_27) ^
>                       (dp_24[21+32] & d_p_26) ^
```

```
>                    (dp_24[22+32] & (d_p[26] ^ d_p[29] ^ (d_p[31] &
>                    d_p[28]) ^ (d_p[31] | d_p[30])))  (dp_24[23+32] &
>                    d_p[25]) ^ (dp_24[23+32] & d_p[31] & d_p[27]) ^
>                    (dp_24[23+32] & d_p[30] & d_p[29]) ^
>                    (dp_24[23+32] & d_p[31]);
>   assign dpp_23 = { { 9{1'b0} }, ({`AR1DPU_INT_WIDTH{d_o[23]}} &
>   d_poly_ex), {23{1'b0}} }; assign dpp_22 = { {10{1'b0}},
>   ({`AR1DPU_INT_WIDTH{d_o[22]}} & d_poly_ex), {22{1'b0}} }; assign
>   dpp_21 = { {11{1'b0}}, ({`AR1DPU_INT_WIDTH{d_o[21]}} & d_poly_ex),
>   {21{1'b0}} }; assign dpp_20 = { {12{1'b0}},
>   ({`AR1DPU_INT_WIDTH{d_o[20]}} & d_poly_ex), {20{1'b0}} }; assign
>   dpp_19 = { {13{1'b0}}, ({`AR1DPU_INT_WIDTH{d_o[19]}} & d_poly_ex),
>   {19{1'b0}} }; assign dpp_18 = { {14{1'b0}},
>   ({`AR1DPU_INT_WIDTH{d_o[18]}} & d_poly_ex), {18{1'b0}} }; assign
>             dpp_17 = { {15{1'b0}},
>             ({`AR1DPU_INT_WIDTH{d_o[17]}} & d_poly_ex),
>   {17{1'b0}} }; assign dpp_16 = { {16{1'b0}},
>   ({`AR1DPU_INT_WIDTH{d_o[16]}} & d_poly_ex), {16{1'b0}} }; assign
>   dp_16 = ((dp_24 ^ dpp_23) ^ dpp_20) ^ ((dpp_22 ^ dpp_21) ^ dpp_19) ^
>   (dpp_18 ^ dpp_17) ^ dpp_16;
>
>   //--------------------------------------------------------
>   // Divider Ex2 stage
>   //--------------------------------------------------------
>   // Note that d_poly_ex is re-used in Ex2 (it must not change!)
>   // REVISIT, merge Ex and Ex2 stages to reduce area
>
>   always @ (posedge clk)
>     if (cmd_div_ex) begin
>       d_din_1_ex2 <= din_b_sh;
>       dp_ex2      <= {d_o[31:16], dp_16[47:0]};
>     end
>
>   // Divider - 1st 8-bits
>   assign d_o[15] = dp_ex2[15+32];
>   assign d_o[14] = dp_ex2[14+32] ^
>            (dp_ex2[15+32] & d_p[31]);
>   assign d_o[13] = dp_ex2[13+32] ^
>            (dp_ex2[14+32] & d_p[31]) ^
>            (dp_ex2[15+32] & d_p_29);
>   assign d_o[12] = dp_ex2[12+32] ^
>            (dp_ex2[13+32] & d_p[31]) ^
>            (dp_ex2[14+32] & d_p_29) ^
>            (dp_ex2[15+32] & d_p_28);
>   assign d_o[11] = dp_ex2[11+32] ^
>            (dp_ex2[12+32] & d_p[31]) ^
>            (dp_ex2[13+32] & d_p_29) ^
>            (dp_ex2[14+32] & d_p_28) ^
>            (dp_ex2[15+32] & d_p_27);
>   assign d_o[10] = dp_ex2[10+32] ^
>            (dp_ex2[11+32] & d_p[31]) ^
>            (dp_ex2[12+32] & (d_p[31] ^ d_p[30])) ^
>            (dp_ex2[13+32] & d_p_28) ^
>            (dp_ex2[14+32] & d_p_27) ^
>            (dp_ex2[15+32] & d_p_26);
>   assign d_o[9] = dp_ex2[9+32] ^
>            (dp_ex2[10+32] & d_p[31]) ^
>            (dp_ex2[11+32] & (d_p[31] ^ d_p[30])) ^
>            (dp_ex2[12+32] & d_p_28) ^
>            (dp_ex2[13+32] & d_p_27) ^
>            (dp_ex2[14+32] & d_p_26) ^
>            (dp_ex2[15+32] & (d_p[26] ^ d_p[29] ^ (d_p[31] &
>   d_p[28]) ^ (d_p[31] | d_p[30]))); assign d_o[8] = dp_ex2[8+32] ^
>            (dp_ex2[ 9+32] & d_p[31]) ^
>            (dp_ex2[10+32] & (d_p[31] ^ d_p[30])) ^
>            (dp_ex2[11+32] & d_p_28) ^
>            (dp_ex2[12+32] & d_p_27) ^
>            (dp_ex2[13+32] & d_p_26) ^
>            (dp_ex2[14+32] & (d_p[26] ^ d_p[29] ^ (d_p[31] &
>            d_p[28]) ^ (d_p[31] | d_p[30])))  (dp_ex2[15+32]
>            & d_p[25]) ^ (dp_ex2[15+32] & d_p[31] & d_p[27]) ^
>            (dp_ex2[15+32] & d_p[30] & d_p[29]) ^
>            (dp_ex2[15+32] & d_p[31]);
>   assign dpp_15 = { {17{1'b0}}, ({`AR1DPU_INT_WIDTH{d_o[15]}} &
>   d_poly_ex), {15{1'b0}} }; assign dpp_14 = { {18{1'b0}},
>   ({`AR1DPU_INT_WIDTH{d_o[14]}} & d_poly_ex), {14{1'b0}} }; assign
>   dpp_13 = { {19{1'b0}}, ({`AR1DPU_INT_WIDTH{d_o[13]}} & d_poly_ex),
>   {13{1'b0}} }; assign dpp_12 = { {20{1'b0}},
>   ({`AR1DPU_INT_WIDTH{d_o[12]}} & d_poly_ex), {12{1'b0}} }; assign
>   dpp_11 = { {21{1'b0}}, ({`AR1DPU_INT_WIDTH{d_o[11]}} & d_poly_ex),
```

```
>          {11{1'b0}} }; assign dpp_10 = { {22{1'b0}},
>          ({'AR1DPU_INT_WIDTH{d_o[10]}} & d_poly_ex), {10{1'b0}} }; assign
>              dpp_9 = { {23{1'b0}}, ({'AR1DPU_INT_WIDTH{d_o[9
>              ]}} & d_poly_ex), { 9{1'b0}} }; assign dpp_8 = {
>              {24{1'b0}}, ({'AR1DPU_INT_WIDTH{d_o[8]}} &
> d_poly_ex), { 8{1'b0}} }; assign dp_8 = ({{32{1'b0}},d_din_1_ex2}
^ dp_ex2) ^ ((dpp_15 ^ dpp_14) ^ dpp_11) ^ ((dpp_13 ^ dpp_12) ^
> dpp_10) ^ (dpp_9 ^ dpp_8);
>    // Divider - 2nd 8-bits
>    assign d_o[7] = dp_8[7+32];
>    assign d_o[6] = dp_8[6+32] ^
>              (dp_8[7+32] & d_p[31]);
>    assign d_o[5] = dp_8[5+32] ^
>              (dp_8[6+32] & d_p[31]) ^
>              (dp_8[7+32] & d_p_29);
>    assign d_o[4] = dp_8[4+32] ^
>              (dp_8[7+32] & d_p_28) ^
>              (dp_8[6+32] & d_p_29) ^
>              (dp_8[5+32] & d_p[31]);
>    assign d_o[3] = dp_8[3+32] ^
>              (dp_8[4+32] & d_p[31]) ^
>              (dp_8[5+32] & d_p_29) ^
>              (dp_8[6+32] & d_p_28) ^
>              (dp_8[7+32] & d_p_27);
>    assign d_o[2] = dp_8[2+32] ^
>              (dp_8[3+32] & d_p[31]) ^
>              (dp_8[4+32] & (d_p[31] ^ d_p[30])) ^
>              (dp_8[5+32] & d_p_28) ^
>              (dp_8[6+32] & d_p_27) ^
>              (dp_8[7+32] & d_p_26);
>    assign d_o[1] = dp_8[1+32] ^
>              (dp_8[2+32] & d_p[31]) ^
>              (dp_8[3+32] & (d_p[31] ^ d_p[30])) ^
>              (dp_8[4+32] & d_p_28) ^
>              (dp_8[5+32] & d_p_27) ^
>              (dp_8[6+32] & d_p_26) ^
>              (dp_8[7+32] & (d_p[26] ^ d_p[29] ^ (d_p[31] &
> d_p[28]) ^ (d_p[31] | d_p[30]))); assign d_o[0] = dp_8[0+32] ^
>              (dp_8[1+32] & d_p[31]) ^
>              (dp_8[2+32] & (d_p[31] ^ d_p[30])) ^
>              (dp_8[3+32] & d_p_28) ^
>              (dp_8[4+32] & d_p_27) ^
>              (dp_8[5+32] & d_p_26) ^
>              (dp_8[6+32] & (d_p[26] ^ d_p[29] ^ (d_p[31] &
>              d_p[28]) ^ (d_p[31] | d_p[30]))) ^ (dp_8[7+32] &
>              d_p[25]) ^ (dp_8[7+32] & d_p[31] & d_p[27]) ^
>              (dp_8[7+32] & d_p[30] & d_p[29]) ^
>              (dp_8[7+32] & d_p[31]);
>    assign dpp_7 = { {25{1'b0}}, ({'AR1DPU_INT_WIDTH{d_o[7]}} &
> d_poly_ex), {7{1'b0}} }; assign dpp_6 = { {26{1'b0}},
> ({'AR1DPU_INT_WIDTH{d_o[6]}} & d_poly_ex), {6{1'b0}} }; assign
> dpp_5 = { {27{1'b0}}, ({'AR1DPU_INT_WIDTH{d_o[5]}} & d_poly_ex),
> {5{1'b0}} }; assign dpp_4 { {28{1'b0}},
> ({'AR1DPU_INT_WIDTH{d_o[4]}} & d_poly_ex), {4{1'b0}} }; assign
> dpp_3 = { {29{1'b0}}, ({'AR1DPU_INT_WIDTH{d_o[3]}} & d_poly_ex),
> {3{1'b0}} }; assign dpp_2 = { {20{1'b0}},
> ({'AR1DPU_INT_WIDTH{d_o[2]}} & d_poly_ex), {2{1'b0}} }; assign
>              dpp_1 = { {31{1'b0}}, ({'AR1DPU_INT_WIDTH{d_o[1]}} &
>              d_poly_ex), {1{1'b0}} }; assign dpp_0 = {
> {32{1'b0}}, ({'AR1DPU_INT_WIDTH{d_o[0]}} & d_poly_ex) }; assign dp_0
> = ((dp_8 ^ dpp_7) ^ dpp_4) ^ ((dpp_6 ^ dpp_5) ^ dpp_3) ^ (dpp_2 ^
> dpp_1) ^ dpp_0;
>
>    // ------------------------------------
>    // Divider Wr stage
>    // ------------------------------------
>    always @ (posedge clk)
>      if (cmd_div_ex2) begin
>        dout_wr <= {dp_ex2[63:48], d_o[15:0], dp_0[31:0]};
>      end
>
>    assign d_rout_wr = cmd_size_wr[1] ? dout_wr[31:0] : (
>                cmd_size_wr[0] ? {{16{1'b0}}, dout_wr[31:16]} :
>                        {{24{1'b0}}, dout_wr[31:24]});
>
>
//------------------------------------------------------------------
-------
> // Output
>
```

```
//--------------------------------------------------------------------
-------
>
>   assign {dout, rout} = cmd_div_wr ? {dout_wr[63:32], d_rout_wr} :
>   m_out;
```

FIG. 5 illustrates a syntax that may be used for a vector polynomial divide instruction. This syntax is similar to that illustrated in FIG. 2, other than the registers storing the numerator value and the resulting quotient value and remainder value being replaced by vector registers. The denominator remains a scalar value stored in a scalar register as it will be appreciated that the denominator quotient and denominator value will often be constant for a long sequence of numerator values. This is the type of behaviour which is associated with a scrambler program for processing in parallel multiple streams of signal data to be transmitted. The quotient polynomial and the quotient value form the data to be transmitted with characteristics more suitable for transmission than the raw numerator value (e.g. a long sequence of constant bit values within the numerator value will be turned into a more readily transmitted alternating pattern of bit values within the quotient value). The polynomial divide instruction of the present technique which generates a quotient value is well suited for use with such scrambler programs seeking to scramble a signal to be transmitted.

FIG. 6 illustrates two ways in which the coefficients of the terms of a polynomial may be stored within registers. In particular, the coefficient of the highest degree term may be stored in either the most significant bit position or the least significant bit position within a register storing a value representing the polynomial coefficients. The other coefficients can follow in turn from this relevant selected end point. This is similar to the coefficients being stored within the registers in either big endian or little endian form.

The polynomial divide instruction of the present technique provides an advantageous combination with a polynomial multiply instruction, which can also be supported by the same processor 4. In this case an additional processing unit similar to polynomial divide circuitry 26 illustrated in FIG. 1 may be added in order to support a polynomial multiply instruction. FIG. 7 illustrates a syntax that may be used for such a polynomial multiply instruction. The first polynomial and the second polynomial are represented by values stored within respective registers r0 and r1. The resulting product polynomial is represented by a product value stored within register r2. The product polynomial value is double the length of the first and second polynomials and accordingly register r2 is twice the length of the registers storing the first and second values representing the first and second polynomials. In practice the register r2 can be provided by a combination of two standard length registers. Alternatively, the register bank 12 could include one or more double width registers such as the 2N-bit registers 14 illustrated in FIG. 1. Such double width registers are often provided for use with multiply accumulate instructions in standard scalar arithmetic and accordingly can be reused for this type of polynomial multiply instruction. These double width registers may also be used to store the numerator value in respect of the polynomial divide instructions previously discussed. In that case the double width register would replace registers r0 and r1 illustrated in FIG. 2 with a single double width register storing the values representing all of the coefficients of the numerator polynomial within a single register.

The operation of a polynomial multiply instruction of various forms including different width versions and a version incorporating an accumulate is given in the following illustrative C code. This code also includes similar representations of polynomial divide instructions. The worker in this technical field will understand that these definitions are the action of these instructions can be used to generate the relevant circuitry to perform such operations in response to an associated instruction specifying that operation.

```
/*----------------------------------------------------------*
 * polynomial multiply long
 *----------------------------------------------------------*/
poly8_t mull_p8(poly8_t x0, poly8_t x1, poly8_t *x2)
{
#ifdef _OPTIMODE_
#pragma OUT x2
#pragma INTRINSIC
#endif
    poly8_t q=x0, r=0;
    int C,i;
    for (i=0; i<8; i++)
    {
        C = r>>7;
        r = r<<1;
        if (q>>7)
        {
            r = r^x1;
        }
        q = (q<<1)|C;
    }
    *x2 = q;    /* (x0*x1) high 8 bits */
    return r;   /* (x0*x1) low 8 bits */
}
poly16_t mull_p16(poly16_t x0, poly16_t x1, poly16_t *x2)
{
#ifdef _OPTIMODE_
#pragma OUT x2
#pragma INTRINSIC
#endif
    poly16_t q=x0, r=0;
    int C,i;
    for (i=0; i<16; i++)
    {
        C = r>>15;
        r = r<<1;
        if (q>>15)
        {
            r = r^x1;
        }
        q = (q<<1)|C;
    }
    *x2 = q;    /* (x0*x1) high 16 bits */
    return r;   /* (x0*x1) low 16 bits */
}
poly32_t mull_p32(poly32_t x0, poly32_t x1, poly32_t *x2)
{
#ifdef _OPTIMODE_
#pragma OUT x2
#pragma INTRINSIC
#endif
    poly32_t q=x0, r=0;
    int C,i;
    for (i=0; i<32; i++)
    {
        C = r>>31;
        r = r<<1;
```

```
        if (q>>31)
        {
            r = r ^ x1;
        }
        q = (q<<1)|C;
    }
    *x2 = q;    /* (x0*x1) high 32 bits */
    return r;   /* (x0*x1) low 32 bits */
}
/*---------------------------------------------------------*
 * polynomial multiply accumulate long
 *---------------------------------------------------------*/
poly8_t mlal_p8(poly8_t x0, poly8_t x1, poly8_t x2, poly8_t x3,
poly8_t *x4)
{
#ifdef __OPTIMODE__
#pragma OUT x4
#pragma INTRINSIC
#endif
    poly8_t q=x2, r=0;
    int C,i;
    for (i=0; i<8; i++)
    {
        C = r>>7;
        r = r<<1;
        if (q>>7)
        {
            r = r ^ x3;
        }
        q = (q<<1)|C;
    }
    *x4 = q ^ x1;  /* ((x1<<8)+x0)+(x2*x3) high 8 bits */
    return r ^ x0; /* ((x1<<8)+x0)+(x2*x3) low 8 bits */
}
poly16_t mlal_p16(poly16_t x0, poly16_t x1, poly16_t x2,
poly16_t x3, poly16_t *x4)
{
#ifdef __OPTIMODE__
#pragma OUT x4
#pragma INTRINSIC
#endif
    poly16_t q=x2, r=0;
    int C,i;
    for (i=0; i<16; i++)
    {
        C = r>>15;
        r = r<<1;
        if (q>>15)
        {
            r = r ^ x3;
        }
        q = (q<<1)|C;
    }
    *x4 = q ^ x1;  /* ((x1<<16)+x0)+(x2*x3) high 16 bits */
    return r ^ x0; /* ((x1<<16)+x0)+(x2*x3) low 16 bits */
}
poly32_t mlal_p32(poly32_t x0, poly32_t x1, poly32_t x2,
poly32_t x3, poly32_t *x4)
{
#ifdef __OPTIMODE__
#pragma OUT x4
#pragma INTRINSIC
#endif
    poly32_t q=x2, r=0;
    int C,i;
    for (i=0; i<32; i++)
    {
        C = r>>31;
        r = r<<1;
        if (q>>31)
        {
            r = r ^ x3;
        }
        q = (q<<1)|C;
    }
    *x4 = q ^ x1;  /* ((x1<<32)+x0)+(x2*x3) high 32 bits */
    return r ^ x0; /* ((x1<<32)+x0)+(x2*x3) low 32 bits */
}
/*---------------------------------------------------------*
 * polynomial long divide
 *---------------------------------------------------------*/
poly8_t divl_p8(poly8_t x0, poly8_t x1, poly8_t x2, poly8_t *x3)
{
#ifdef __OPTIMODE__
#pragma OUT x3
#pragma INTRINSIC
#endif
    poly8_t q=x0, r=x1, p=x2;
    int C,i;
    for (i=0; i<8; i++)
    {
        C = r>>7;
        r = r<<1;
        if (C)
        {
            r = r ^ p;
        }
        if (q>>7)
        {
            r = r ^ 1;
        }
        q = (q<<1)|C;
    }
    *x3 = q;    /* ((x1<<8)+x0) div ((1<<8)+x2) */
    return r;   /* ((x1<<8)+x0) mod ((1<<8)+x2) */
}
poly16_t divl_p16(poly16_t x0, poly16_t x1, poly16_t x2,
poly16_t *x3)
{
#ifdef __OPTIMODE__
#pragma OUT x3
#pragma INTRINSIC
#endif
    poly16_t q=x0, r=x1, p=x2;
    int C,i;
    for (i=0; i<16; i++)
    {
        C = r>>15;
        r = r<<1;
        if (C)
        {
            r = r ^ p;
        }
        if (q>>15)
        {
            r = r ^ 1;
        }
        q = (q<<1)|C;
    }
    *x3 = q;    /* ((x1<<16)+x0) div ((1<<16)+x2) */
    return r;   /* ((x1<<16)+x0) mod ((1<<16)+x2) */
}
poly32_t divl_p32(poly32_t x0, poly32_t x1, poly32_t x2,
poly32_t *x3)
{
#ifdef __OPTIMODE__
#pragma OUT x3
#pragma INTRINSIC
#endif
    poly32_t q=x0, r=x1, p=x2;
    int C,i;
    for (i=0; i<32; i++)
    {
        C = r>>31;
        r = r<<1;
        if (C)
        {
            r = r ^ p;
        }
        if (q>>31)
        {
            r = r ^ 1;
        }
        q = (q<<1)|C;
    }
    *x3 = q;    /* ((x1<<32)+x0) div ((1<<32)+x2) */
    return r;   /* ((x1<<32)+x0) mod ((1<<32)+x2) */
}
```

Whilst the above described techniques may be performed by hardware executing a sequence of native instructions which include the above-mentioned instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described re-arrangement instructions may be executed as native instructions to the full or partial virtual machine, with the virtual machine together with its underlying hardware platform operating in combination to provide the polynomial processing described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus for processing data comprising:
an instruction decoder responsive to a program instruction to generate one or more control signals;
a register bank having a plurality of registers; and
processing circuitry coupled to said instruction decoder and said register bank and responsive to said one or more control signals to perform a data processing operation corresponding to said program instruction upon one or more data values stored within said register bank; wherein
said instruction decoder is responsive to a polynomial divide instruction as a single instruction to generate one or more control signals that control said processing circuitry to generate as an output stored in said plurality of registers at least a quotient value representing a quotient polynomial for a polynomial division over a field of two elements of a numerator polynomial by a denominator polynomial, said denominator polynomial being an N degree polynomial given by the sum of $c_i x^i$ for $N \geq i \geq 0$, where $c_{(N-1)}$ to $c_0$ are respective bits stored in a register of said register bank and $c_N=1$ and is not stored within said register, and the degree N of the denominator polynomial is greater than one.

2. Apparatus for processing data comprising:
an instruction decoder responsive to a program instruction to generate one or more control signals;
a register bank having a plurality of registers; and
processing circuitry coupled to said instruction decoder and said register bank and responsive to said one or more control signals to perform a data processing operation corresponding to said program instruction upon one or more data values stored within said register bank; wherein
said instruction decoder is responsive to a polynomial divide instruction as a single instruction to generate one or more control signals that control said processing circuitry to generate as an output stored in said plurality of registers at least a quotient value representing a quotient polynomial for a polynomial division over a field of two elements of a numerator polynomial by a denominator polynomial, said denominator polynomial being an N degree polynomial given by the sum of $c_i x^i$ for where $N \geq i \geq 0$, where $c_{(N-1)}$ to $c_0$ are respective bits stored in a register of said register bank and $c_N=1$ and is not stored within said register, and said register is an N-bit register.

3. Apparatus as claimed in claim 1, wherein said register bank comprises a plurality of N-bit registers.

4. Apparatus as claimed in claim 1, wherein a polynomial is represented by one of:
(i) a value within an M-bit register with a coefficient $c_k$ for term $x^k$ being bit k of said M-bit register, where $(M-1) \geq k \geq 0$; and
(ii) a value within an M-bit register with a coefficient $c_k$ for term $x^k$ being bit $(M-1)-k$ of said M-bit register, where $(M-1) \geq k \geq 0$.

5. Apparatus as claimed in claim 3, wherein said numerator polynomial is represented by a 2N-bit numerator value stored within two of said plurality of N-bit registers.

6. Apparatus as claimed in claim 1, wherein said numerator polynomial is represented by a 2N-bit numerator value stored within a 2N-bit register of said plurality of registers.

7. Apparatus as claimed in claim 1, wherein said processing circuitry is controlled by said control signals generated by said instruction decoder in response to said polynomial divide instruction to generate a remainder value representing a remainder polynomial resulting from polynomial division of said numerator polynomial by said denominator polynomial.

8. Apparatus as claimed in claim 7, wherein said remainder value is an N-bit remainder value stored within an N-bit register of said plurality of registers.

9. Apparatus as claimed in claim 1, wherein said quotient value is an N-bit quotient value stored within an N-bit register of said plurality of registers.

10. Apparatus as claimed in claim 1, wherein said polynomial divide instruction is part of scrambler program code executed by said apparatus to scramble a signal to be transmitted using generated quotient values.

11. Apparatus as claimed in claim 1, wherein said register bank comprises a plurality of general purpose scalar registers used by program instructions other than said polynomial divide instruction.

12. Apparatus as claimed in claim 1, wherein said instruction decoder is responsive to a polynomial multiply instruction to generate one or more control signals that control said processing circuitry to generate at least a product value representing a product polynomial for a polynomial multiplication over a field of two elements of a first polynomial by a second polynomial.

13. Apparatus as claimed in claim 1, wherein said polynomial divide instruction is a vector instruction with said denominator value being a scalar value and said quotient value and a numerator value representing said numerator polynomial being vector values.

14. A method of processing data comprising the steps of:
decoding a program instruction to generate one or more control signals;
in response to said one or more control signals, performing a data processing operation corresponding to said program instruction upon one or more data values stored within a register bank having a plurality of registers; wherein
said decoding is responsive to a polynomial divide instruction as a single instruction to generate one or more control signals that control generation as an output stored in said plurality of registers of at least a quotient value representing a quotient polynomial for a polynomial division over a field of two elements of a numerator polynomial by a denominator polynomial, said denominator polynomial being an N degree polynomial given by the sum of $c_i x^i$ for $N \geq i \geq 0$, where $c_{(N-1)}$ to $c_0$ are respective bits stored in a register of said register bank and $c_N=1$ and is not stored within said register, and the degree N of the denominator polynomial is greater than one.

15. A method of processing data comprising the steps of:
decoding a program instruction to generate one or more control signals;
in response to said one or more control signals, performing a data processing operation corresponding to said program instruction u on one or more data values stored within a register bank having a plurality of registers; wherein
said decoding is responsive to a polynomial divide instruction as a single instruction to generate one or more control signals that control generation as an output stored in said plurality of registers of at least a quotient value representing a quotient polynomial for a polynomial division over a field of two elements of a numerator polynomial by a denominator polynomial, said denominator polynomial being an N degree polynomial given by the sum of $c_i x^i$ for $N \geq i \geq 0$, where $c_{(N-1)}$ to $c_0$ are respective bits stored in a register of said register bank and $c_N=1$ and is not stored within said register, and said register is an N-bit register.

16. A method as claimed in claim 14, wherein said register bank comprises a plurality of N-bit registers.

17. A method as claimed in claim 14, wherein a polynomial is represented by one of:
(i) a value within an M-bit register with a coefficient $c_k$ for term $x^k$ being bit k of said M-bit register, where $(M-1) \geq k \geq 0$; and
(ii) a value within an M-bit register with a coefficient $c_k$ for term $x^k$ being bit $(M-1)-k$ of said M-bit register, where $(M-1) \geq k \geq 0$.

18. A method as claimed in claim 16, wherein said numerator polynomial is represented by a 2N-bit numerator value stored within two of said plurality of N-bit registers.

19. A method as claimed in claim 14, wherein said numerator polynomial is represented by a 2N-bit numerator value stored within a 2N-bit register of said plurality of registers.

20. A method as claimed in claim 14, wherein said control signals generated by decoding said polynomial divide instruction control generation of a remainder value representing a remainder polynomial resulting from polynomial division of said numerator polynomial by said denominator polynomial.

21. A method as claimed in claim 20, wherein said remainder value is an N-bit remainder value stored within an N-bit register of said plurality of registers.

22. A method as claimed in claim 14, wherein said quotient value is an N-bit quotient value stored within an N-bit register of said plurality of registers.

23. A method as claimed in claim 14, wherein said polynomial divide instruction is part of scrambler program code executed to scramble a signal to be transmitted using generated quotient values.

24. A method as claimed in claim 14, wherein said register bank comprises a plurality of general purpose scalar registers used by program instructions other than said polynomial divide instruction.

25. A method as claimed in claim 14, wherein said decoding is responsive to a polynomial multiply instruction to generate one or more control signals that control generation of at least a product value representing a product polynomial for a polynomial multiplication over a field of two elements of a first polynomial by a second polynomial.

26. A method as claimed in claim 14, wherein said polynomial divide instruction is a vector instruction with said denominator value being a scalar value and said quotient value and a numerator value representing said numerator polynomial being vector values.

27. A computer program product comprising a computer program storage medium storing a computer program for controlling an apparatus for processing data in accordance with a method as claimed in claim 14.

28. Apparatus as claimed in claim 1, wherein the degree N of the denominator polynomial is one of 8, 16, and 32.

29. A method as claimed in claim 14, wherein the degree N of the denominator polynomial is one of 8, 16, and 32.

* * * * *